(12) United States Patent
Galbreath et al.

(10) Patent No.: US 8,443,075 B2
(45) Date of Patent: May 14, 2013

(54) TRANSACTION STORAGE DETERMINATION VIA PATTERN MATCHING

(75) Inventors: Morris C. Galbreath, Wooland Park, CO (US); Dan Prescott, Elbert, CO (US)

(73) Assignee: Fluke Corporation, Everett, WA (US)

( * ) Notice: Subject to any disclaimer, the term of this patent is extended or adjusted under 35 U.S.C. 154(b) by 101 days.

(21) Appl. No.: 12/608,822

(22) Filed: Oct. 29, 2009

(65) Prior Publication Data

US 2011/0106936 A1 May 5, 2011

(51) Int. Cl.
*G06F 15/173* (2006.01)
(52) U.S. Cl.
USPC .......................................... 709/224; 709/225
(58) Field of Classification Search ........... 709/224–225
See application file for complete search history.

(56) References Cited

U.S. PATENT DOCUMENTS

| | | | |
|---|---|---|---|
| 6,611,873 B1 * | 8/2003 | Kanehara ...................... 709/238 |
| 7,095,421 B2 * | 8/2006 | Vijayakumar et al. ......... 345/613 |
| 7,454,457 B1 * | 11/2008 | Lowery et al. ................. 709/203 |
| 7,577,736 B1 * | 8/2009 | Ovenden ....................... 709/224 |
| 7,987,239 B2 * | 7/2011 | Agarwalla et al. ............ 709/217 |
| 8,099,476 B2 * | 1/2012 | Biderman et al. ............. 709/219 |
| 2002/0052798 A1 * | 5/2002 | Nishikado et al. ............. 705/26 |
| 2004/0010473 A1 * | 1/2004 | Hsu et al. ...................... 705/77 |
| 2004/0034800 A1 * | 2/2004 | Singhal et al. ................. 713/201 |
| 2005/0010727 A1 * | 1/2005 | Cuomo et al. ................. 711/138 |
| 2006/0253566 A1 * | 11/2006 | Stassinopoulos et al. .... 709/224 |
| 2007/0140131 A1 * | 6/2007 | Malloy et al. ................. 370/241 |
| 2008/0225711 A1 * | 9/2008 | Raszuk et al. ............. 370/230.1 |
| 2010/0095064 A1 * | 4/2010 | Aviles ........................... 711/118 |
| 2010/0169459 A1 * | 7/2010 | Biderman et al. ............ 709/219 |
| 2010/0218250 A1 * | 8/2010 | Mori et al. ...................... 726/22 |
| 2010/0223425 A1 * | 9/2010 | Meagher et al. .............. 711/104 |
| 2010/0278186 A1 * | 11/2010 | Ackerman et al. ............ 370/401 |

FOREIGN PATENT DOCUMENTS

| | | |
|---|---|---|
| EP | 1635534 A2 | 3/2006 |
| WO | 00/52904 A1 | 9/2000 |

OTHER PUBLICATIONS

Nevil Brownlee the University of Auckland: "SRI: A language for Describing Traffic A Flows and Specifying Actions for Flow Groups; draft-ietf-rtfm-ruleset-language-06.txt", IETF Standard-Work Ing-Draft, Internet Engineering Task Force, IETF, CH, vol. rtfm, no. 6, Jun. 1, 1999, XP015027075, ISSN: 0000-0004.

Nevil Brownlee the University of Auckland Cyndi Mills GTE Laboratories et al: "Traffic Flow Measurement: Architecture; draft-ietf-rtfm-architecture- 08.txt", IETF Standard-Working-Draft, Internet Engineering Task Force, IETF, CH, vol. rtfm, No. 8, Aug. 1, 1999, XP015027045, ISSN: 0000-0004.

"NetFlow Services and Applications", Cisco White Paper, XX, XX, Mar. 1, 1999, pp. 1-27, XP002258359.

* cited by examiner

*Primary Examiner* — Duyen Doan
(74) *Attorney, Agent, or Firm* — Edwards Wildman Palmer LLP; Scott D. Wofsy; Christopher J. Capelli

(57) ABSTRACT

A network analyzer, system and method determine whether or not network transaction data derived from network analysis should be stored, based on a configuration. Configuration strings (patterns) are entered via a configuration file, including specifying whether the string should be a prefix, suffix, other location or exist anyplace in the data. Storage enabling/disabling is provided for network transaction data. Configuration strings (patterns) can be specified for request/response summary/detail, and for specified parameters.

20 Claims, 3 Drawing Sheets

TRANSACTION STORAGE DETERMINATION VIA PATTERN MATCHING

BACKGROUND OF THE INVENTION

This invention relates to networking, and more particularly to monitoring and analysis of network traffic and determination of whether transactions data are to be stored based on pattern matching.

In complex and large computer networking environment, large amounts of data will be passed across the network. The data will represent a variety of different applications and users and protocols, and from the perspective of network analysis, the amount of data can be overwhelming. From a network monitoring perspective, the amount of data quickly becomes too large and ways to efficiently process the information become important. Data storage of monitored data can quickly become an issue. As an example, in monitoring traffic resulting from a user accessing web sites, it is typical for many image type data to be transferred. From the perspective of the network monitoring for troubleshooting or performance analysis, the image data would likely not be desired to be stored. Heretofore, there was no ability to easily determine that the data should or should not be stored at the time of data collection by the monitoring device.

SUMMARY OF THE INVENTION

In accordance with the invention, a network monitoring system and device employs configurable pattern matching to determine whether monitored network traffic transaction data should be stored or not.

Accordingly, it is an object of the present invention to provide an improved network monitor system that allows configuration to determine whether or not to store monitored transaction data.

It is a further object of the present invention to provide an improved network monitor system that employs pattern matching of monitored data with a configuration specification to determine whether or not to store monitored transaction data.

It is yet another object of the present invention to provide an improved network monitor and system to allow specification of patterns and locations inside sets of data and specification of whether to store transactions based on pattern matching.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a network monitoring system, apparatus and method, wherein pattern matching is employed to determine whether to store transactions data during monitoring.

Figure 1:
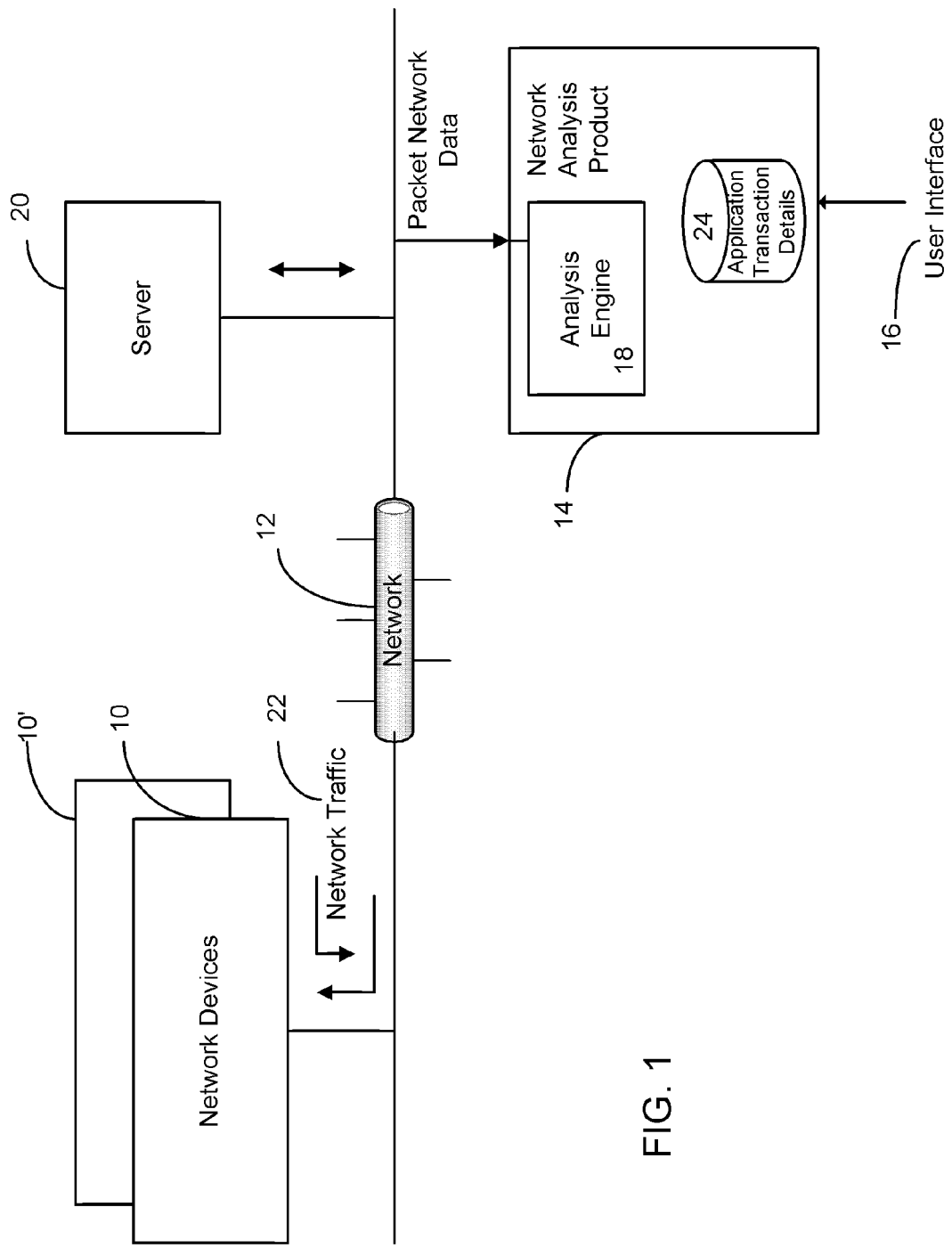
FIG. 1 is a block diagram of a network with monitoring system.

Referring to FIG. 1, a block diagram of a network with an apparatus in accordance with the disclosure herein, a network may comprise plural network devices 10, 10', etc., which communicate over a network 12 by sending and receiving network traffic 22. The traffic may be sent in packet form, with varying protocols and formatting thereof, representing data from a variety of applications and users.

A network analysis product 14 is also connected to the network, and may include a user interface 16 that enables a user to interact with the network analysis product to operate the analysis product and obtain data therefrom, whether at the location of installation or remotely from the physical location of the analysis product network attachment.

The network analysis product comprises hardware and software, CPU, memory, interfaces and the like to operate to connect to and monitor traffic on the network, as well as performing various testing and measurement operations, transmitting and receiving data and the like. When remote, the network analysis product typically is operated by running on a computer or workstation interfaced with the network.

The analysis product comprises an analysis engine 18 which receives the packet network data and interfaces with application transaction details data store 24.

Figure 2:
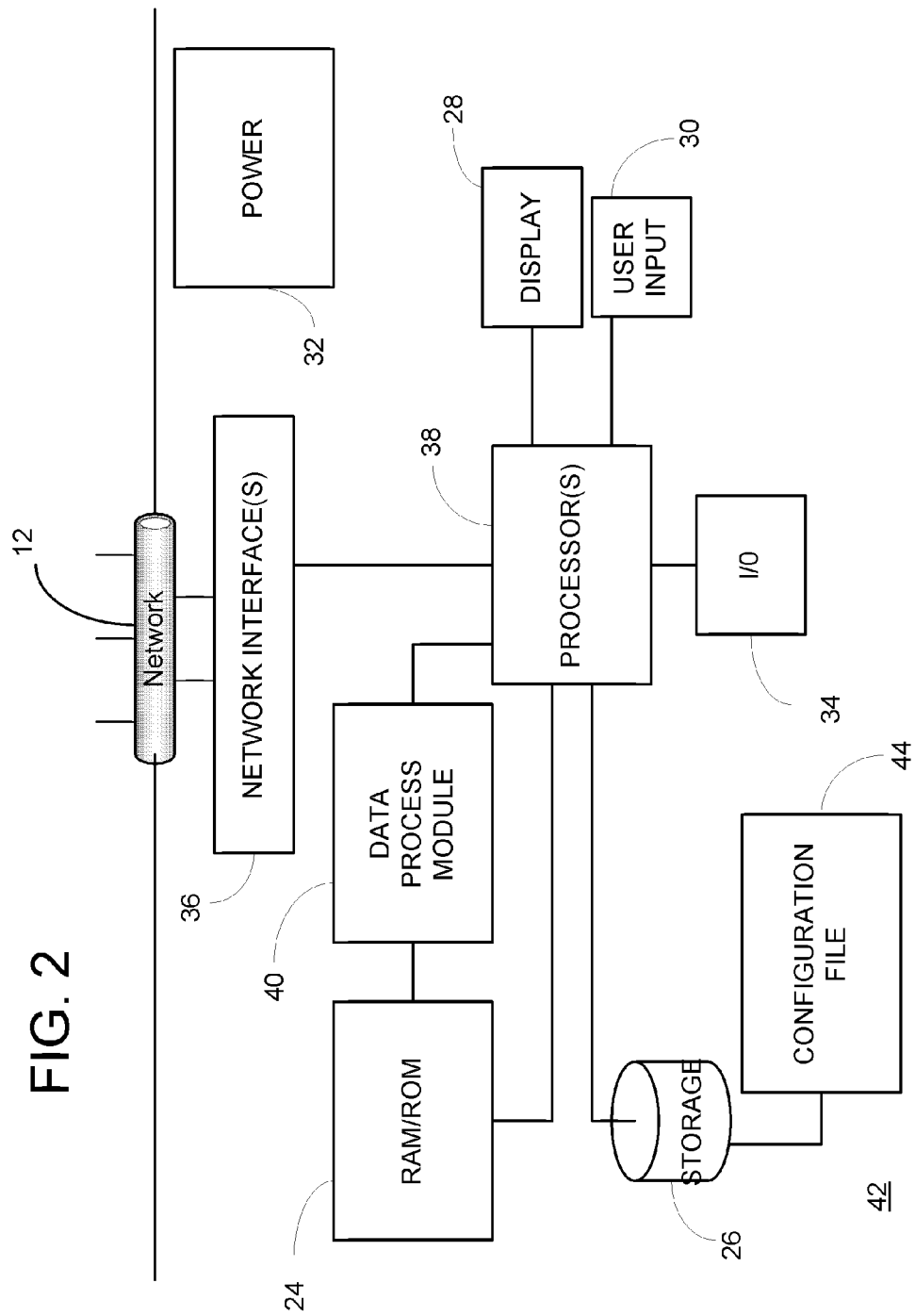
FIG. 2 is a block diagram of a monitor device for transaction storage determination via pattern matching.

FIG. 2 is a block diagram of a test instrument/analyzer 42 via which the invention can be implemented, wherein the instrument may include network interfaces 36 which attach the device to a network 12 via multiple ports, one or more processors 38 for operating the instrument, memory such as RAM/ROM 24 or persistent storage 26, display 28, user input devices 30 (such as, for example, keyboard, mouse or other pointing devices, touch screen, etc.), power supply 32 which may include battery or AC power supplies, other interface 34 which attaches the device to a network or other external devices (storage, other computer, etc.). Data processing module 40 provides processing of observed network data to determine network transaction data storage based upon multiple constraints. This is suitably implemented by pattern matching to determine whether the data is to be stored, as discussed further herein.

In operation, the network test instrument is attached to the network, and observes transmissions on the network to collect information.

In observing data, the network test instrument generates analysis transactions data based on the network data. In accordance with the invention, decisions of whether to store or not to store the transaction data is made, based on a configurable pattern match.

To provide the functionality, a data pattern, along with specifications for data location, including a specified section of the transaction data, and the location inside of the specified section of an observed network transaction may be specified, for example by a user. The configuration strings (patterns) may be stored in a file for use by the system. Pattern matching is performed on the transaction data, enabling data to be saved only if the end user has predetermined it is of interest (by specifying it in the pattern matching data and location specification, enabling the end user to screen out unwanted, or unnecessary, network transaction data from being stored, with the additional benefit of increased data storage capacity. Since in a busy or large network, vast amounts of data and resulting transaction data can result, the invention provides a user with the ability to specify what transactional and statistical data the user thinks is important, and storing data that the user has indicated is of interest, rather than storing all or most of the data and then later excluding un-important data.

In a particular embodiment, a configuration file 44 is provided that contains configuration strings (patterns) providing definitions for data patterns based upon inclusion in multiple data types, in conjunction with sets of vectors and an algorithm to determine the pattern membership. The data location in different locations of the transaction data, along with data position (prefix, i.e., must occur at the start of the data, suffix, i.e., must occur at the end of the data, or exist anyplace in the data) in the given transaction location, is specified in the configuration file. The configuration file is read and processed into arrays of vectors based upon data types and size of source data. Network transaction data can then be processed through the vector sets, discriminated by data type, and quickly determined to contain any of the given patterns, which can then be used to determine transaction storage.

Figure 3:
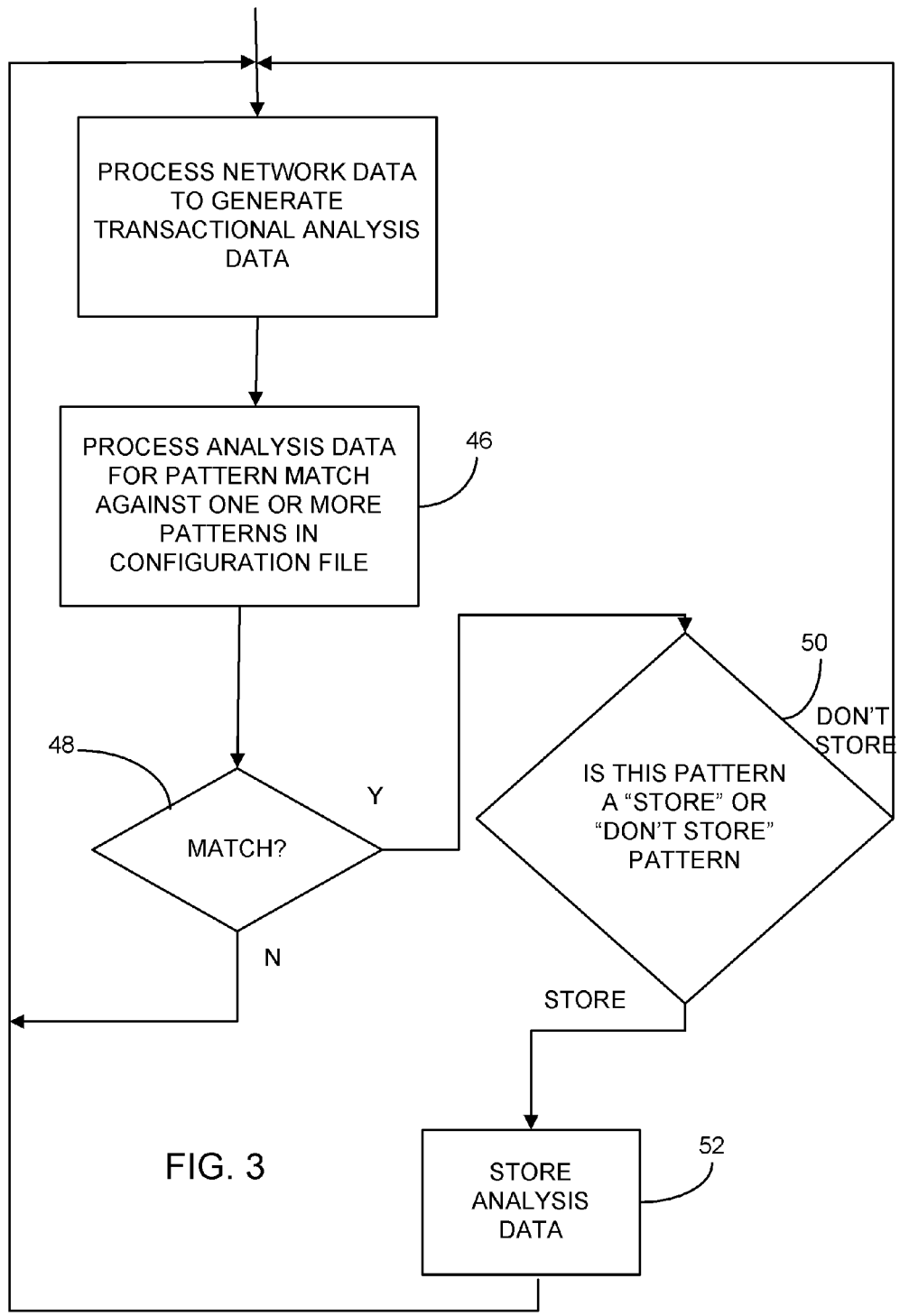
FIG. 3 is a flow chart of operational steps of the system of transaction storage determination.

Referring to FIG. 3, a flow chart of operational steps of the system of transaction storage determination, the network transaction data is processed against the patterns indicated in the configuration file (block 46). As noted above, the pattern indication may include the particular data, which may include any application type data, data type, etc., any transaction with a data payload. The pattern indication may also include the location, prefix, suffix or anywhere in data, including but not limited to looking for a pattern in a specified location within the data. In decision block 48, if no match is found, the data is discarded and processing continues with next data. If a pattern match is found, then if the configuration data indicates that transaction data matching this pattern is to be stored (a STORE data pattern, block 50)), the data may be stored (block 52) for later use and/or analysis. Otherwise, if the data is a 'DON'T STORE' data pattern, the transaction data is not stored, and processing continues looking for further pattern matches or looking at further data.

Note that in a particular use of the system, there may typically be plural patterns and locations for the patterns that would be indicated by the configuration file, for complex monitoring of network systems. The configuration file is suitably provided by a user specification of specific items of interest, or may be a pre-defined configuration set of items of typical interest relevant to specific monitoring needs for typical users.

The operational steps are suitably performed by the processor(s) 38 (FIG. 2).

In accordance with the system, apparatus and method, a user is able to specify pattern matching to apply to transaction data and an indication of store or don't store for matching data, allowing enhanced flexibility and ease of monitoring of high volume network traffic systems so that only transaction data that may be of current or future interest to the user is stored.

By providing the ability to store or not store transaction data matching a particular pattern, as well as the ability to specify types of pattern matching or location, whether to look at a complete data set or a subset thereof, enhanced monitoring and analysis of network traffic of any transaction type, of any application type, is provided. More efficient use of storage is obtained and the user is provided with data more focused to the interest or desire of the user. The user is able to specify what data is important for storage instead of storing all data and requiring later elimination of data that is not of interest.

The system, method and apparatus may suitably be implemented within a network test instrument.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A system for transaction storage determination via pattern matching for network monitoring, comprising:
   a network monitoring system for monitoring network traffic and generating network transaction data therefrom;
   a pattern matching specification, said pattern matching specification including a data position specification for indicating a restriction component on data position within the transaction data in order to meet the pattern matching specification;
   a processor for applying the pattern matching specification to the network transaction data and storing network transaction data in accordance with the pattern matching specification.

2. The system according to claim 1, further comprising a STORE/DON'T STORE indication, wherein if the indication is STORE and the application of the pattern matching specification results in a match, storing the network transaction data.

3. The system according to claim 1, further comprising a STORE/DON'T STORE indication, wherein if the indication is DON'T STORE and the application of the pattern matching specification results in a match, not storing the network transaction data.

4. A network test instrument for network monitoring, comprising:
   an interface for receiving network traffic;
   a processor implementing monitoring the received network traffic and generating network transaction data therefrom;
   said processor applying a pattern matching specification to the network transaction data, said pattern matching specification including a STORE/DON'T STORE indication, and storing or not storing the network transaction data based on said pattern matching specification application, said pattern matching specification further including a data position specification for indicating a restriction component on data position within the transaction data in order to meet the pattern matching specification.

5. The network test instrument according to claim 4, wherein if the indication is STORE and the application of the pattern matching specification results in a match, storing the network transaction data.

6. The network test instrument according to claim 4, wherein if the indication is DON'T STORE and the application of the pattern matching specification results in a match, not storing the network transaction data.

7. A method of network monitoring, comprising:
   providing a network test instrument;
   receiving network traffic via the network test instrument;
   monitoring the received network traffic with the network test instrument and generating network transaction data therefrom;
   applying a pattern matching specification with the network test instrument to the network transaction data, said pattern matching specification including a data position specification for indicating a restriction component on data position within the transaction data in order to meet the pattern matching specification, and storing or not storing the network transaction data based on said pattern matching specification application.

8. The method according to claim 7, wherein if the application of the pattern matching specification results in a match, storing the network transaction data.

9. The method according to claim 7, wherein if the application of the pattern matching specification results in a match, not storing the network transaction data.

10. The method according to claim 7, wherein said data position specification is selected from the group consisting of a specified section of the transaction data, prefix, suffix, or exist anyplace in the data.

11. The method according to claim 7, wherein said data position specification comprises a specified section of the transaction data.

12. The method according to claim 7, wherein said data position specification comprises prefix.

13. The method according to claim 7, wherein said data position specification comprises suffix.

14. The method according to claim 7, wherein said data position specification comprises anyplace in the data.

15. The system according to claim 1, wherein said data position specification is selected from the group consisting of a specified section of the transaction data, prefix, suffix, or exist anyplace in the data.

16. The system according to claim 1, wherein said data position specification comprises a specified section of the transaction data.

17. The system according to claim 1, wherein said data position specification comprises prefix.

18. The system according to claim 1, wherein said data position specification comprises suffix.

19. The system according to claim 1, wherein said data position specification comprises anyplace in the data.

20. The network test instrument according to claim 4, wherein said data position specification for indicating any restriction on data position within the transaction data in order to meet the pattern matching specification is selected from the group consisting of a specified section of the transaction data, prefix, suffix, or exist anyplace in the data.

* * * * *